United States Patent
Ma et al.

(10) Patent No.: US 12,524,152 B2
(45) Date of Patent: Jan. 13, 2026

(54) PHYSICAL HOST OPTIMIZING MEMORY MIGRATION, OPERATION METHOD OF PHYSICAL HOST, AND COMPUTER-READABLE STORAGE MEDIUM THEREOF

(71) Applicant: Alibaba Innovation Private Limited, Singapore (SG)

(72) Inventors: Jiacheng Ma, Shanghai (CN); Tianchan Guan, Shanghai (CN); Yijin Guan, Beijing (CN); Dimin Niu, Sunnyvale, CA (US); Hongzhong Zheng, Los Gatos, CA (US)

(73) Assignee: Alibaba Innovation Private Limited, Singapore (SG)

( * ) Notice: Subject to any disclaimer, the term of this patent is extended or adjusted under 35 U.S.C. 154(b) by 0 days.

(21) Appl. No.: 18/654,494

(22) Filed: May 3, 2024

(65) Prior Publication Data

US 2024/0370168 A1    Nov. 7, 2024

(30) Foreign Application Priority Data

May 5, 2023    (CN) .......................... 202310511973.0

(51) Int. Cl.
    G06F 3/06    (2006.01)

(52) U.S. Cl.
    CPC ............ *G06F 3/061* (2013.01); *G06F 3/0647* (2013.01); *G06F 3/0656* (2013.01); *G06F 3/0673* (2013.01)

(58) Field of Classification Search
    CPC ...... G06F 3/0647; G06F 3/0673; G06F 3/061; G06F 12/1009
    See application file for complete search history.

(56) References Cited

U.S. PATENT DOCUMENTS

| | | | | |
|---|---|---|---|---|
| 2002/0133512 A1* | 9/2002 | Milillo | ............... | G06F 11/2082 |
| 2004/0073831 A1* | 4/2004 | Yanai | ................. | G06F 11/2074 714/6.32 |
| 2007/0204119 A1* | 8/2007 | Murotani | ............. | G06F 3/0664 711/112 |
| 2015/0007172 A1* | 1/2015 | Hudzia | ............... | G06F 9/45558 718/1 |
| 2017/0046186 A1* | 2/2017 | Tsirkin | ................ | G06F 9/45533 |
| 2020/0192691 A1* | 6/2020 | Jiang | ..................... | G06F 12/109 |
| 2020/0341797 A1* | 10/2020 | Tsirkin | ................. | G06F 3/0647 |
| 2022/0405253 A1* | 12/2022 | Agrawal | ................ | G06F 3/061 |
| 2023/0004317 A1* | 1/2023 | Wu | ........................ | G06F 3/0688 |
| 2024/0160372 A1* | 5/2024 | Helmick | ................ | G06F 3/067 |

\* cited by examiner

*Primary Examiner* — Edward J Dudek, Jr.
(74) *Attorney, Agent, or Firm* — Finnegan, Henderson, Farabow, Garrett & Dunner, LLP (57) ABSTRACT

A physical host includes a memory, a first buffer, a second buffer, a third buffer and a processor. The first buffer stores a log regarding dirty pages. The second buffer stores a dirty bitmap, where the dirty bitmap is written into the second buffer according to the log read from the first buffer. The third buffer stores the dirty bitmap. The processor obtains the current memory address to be migrated and a destination memory address, and marks a page table corresponding to the memory address to be migrated as dirty pages and writes the log marked as the dirty pages into the first buffer when the memory address to be migrated is written. The processor includes a memory copy engine for reading the dirty bitmap from the third buffer, and copying the content corresponding to the dirty pages to the destination memory according to the dirty bitmap.

19 Claims, 6 Drawing Sheets

PHYSICAL HOST OPTIMIZING MEMORY MIGRATION, OPERATION METHOD OF PHYSICAL HOST, AND COMPUTER-READABLE STORAGE MEDIUM THEREOF

CROSS-REFERENCE TO RELATED APPLICATIONS

The disclosure claims the benefits of priority to Chinese Application No. 202310511973.0, filed on May 5, 2023, which is incorporated herein by reference in its entirety.

TECHNICAL FIELD

The present disclosure relates to a physical host, an operation method of a physical host, and a computer-readable storage medium for executing the operation method, in particular to a physical host optimizing memory migration, an operation method of the physical host optimizing memory migration, and a computer-readable storage medium for executing the operation method.

BACKGROUND

During the process of memory migration in a physical host, memory copying takes up a large amount of time. When a certain part of a memory needs to be migrated from an original block (such as a source memory) to another block of the memory (such as a destination memory), in order to prevent this part from being modified or written during copying, a processor of the physical host needs to execute a write-protection operation on this part and update page table entries corresponding to this part in a page table to the destination memory. During the migration of this part, a user needs to wait for the migration to complete before accessing or writing this part, and the pause caused by migration may lead to a decrease in the performance of the physical host and a poor user experience effect.

SUMMARY

The disclosed embodiments of the present disclosure provide a physical host optimizing memory migration, an operation method of the physical host, and a computer-readable storage medium for executing the operation method to solve the above problems.

Some embodiments of the present disclosure provide a physical host including a memory, a first buffer, a second buffer, a third buffer and a processor. The first buffer stores a log regarding a plurality of dirty pages. The second buffer stores a dirty bitmap, where the dirty bitmap is written into the second buffer according to the log read from the first buffer. The third buffer stores the dirty bitmap. The processor obtains the current memory address to be migrated and a destination memory address, and marks a page table corresponding to the memory address to be migrated as a plurality of dirty pages and writes the log marked as the plurality of dirty pages into the first buffer when the memory address to be migrated is written. The processor includes a memory copy engine for reading the dirty bitmap from the third buffer, and copying the content corresponding to the plurality of dirty pages to the destination memory according to the dirty bitmap.

Some embodiments of the present disclosure provide an operation method of a physical host, where the physical host includes a memory, a processor, a first buffer, a second buffer and a third buffer; the method includes: obtaining the current memory address to be migrated and a destination memory address; marking a page table corresponding to the memory address to be migrated as a plurality of dirty pages and writing the log marked as the plurality of dirty pages into the first buffer when the memory address to be migrated is written; reading the log from the first buffer, and writing the dirty bitmap into the second buffer according to the log, where the dirty bitmap indicates a plurality of pages of the plurality of dirty pages; copying the dirty bitmap read from the second buffer to the third buffer; and reading the dirty bitmap from the third buffer, and copying the content of the plurality of dirty pages corresponding to the dirty bitmap to the destination memory address.

Some embodiments of the present disclosure provide a non-transitory computer-readable storage medium storing a set of instructions that are executable by one or more processors of a device to cause the device to execute the operation method of the physical host as mentioned above.

BRIEF DESCRIPTION OF THE DRAWINGS

The accompanying drawings described herein are used for providing a further understanding of this disclosure, and form part of this disclosure. Exemplary embodiments of this disclosure and descriptions thereof are used for explaining this disclosure, and do not constitute any inappropriate limitation to this disclosure. It should be noted that according to industry standard practices, various structures are not drawn to scale. In fact, for clear discussion, the sizes of various structures may be increased or reduced arbitrarily. In the accompanying drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms or definitions incorporated by reference.

In the present disclosure, according to the memory range indicated by a migration window memory, the physical host currently only executes memory migration of the first part of the part to be migrated, and other parts which are not migrated can still be written; and the physical host only needs to copy the content of a small amount of dirty pages during memory migration. Therefore, the physical host of the present disclosure can effectively reduce the performance impact on the overall physical host during memory migration to provide users with a better experience effect.

Figure 1:
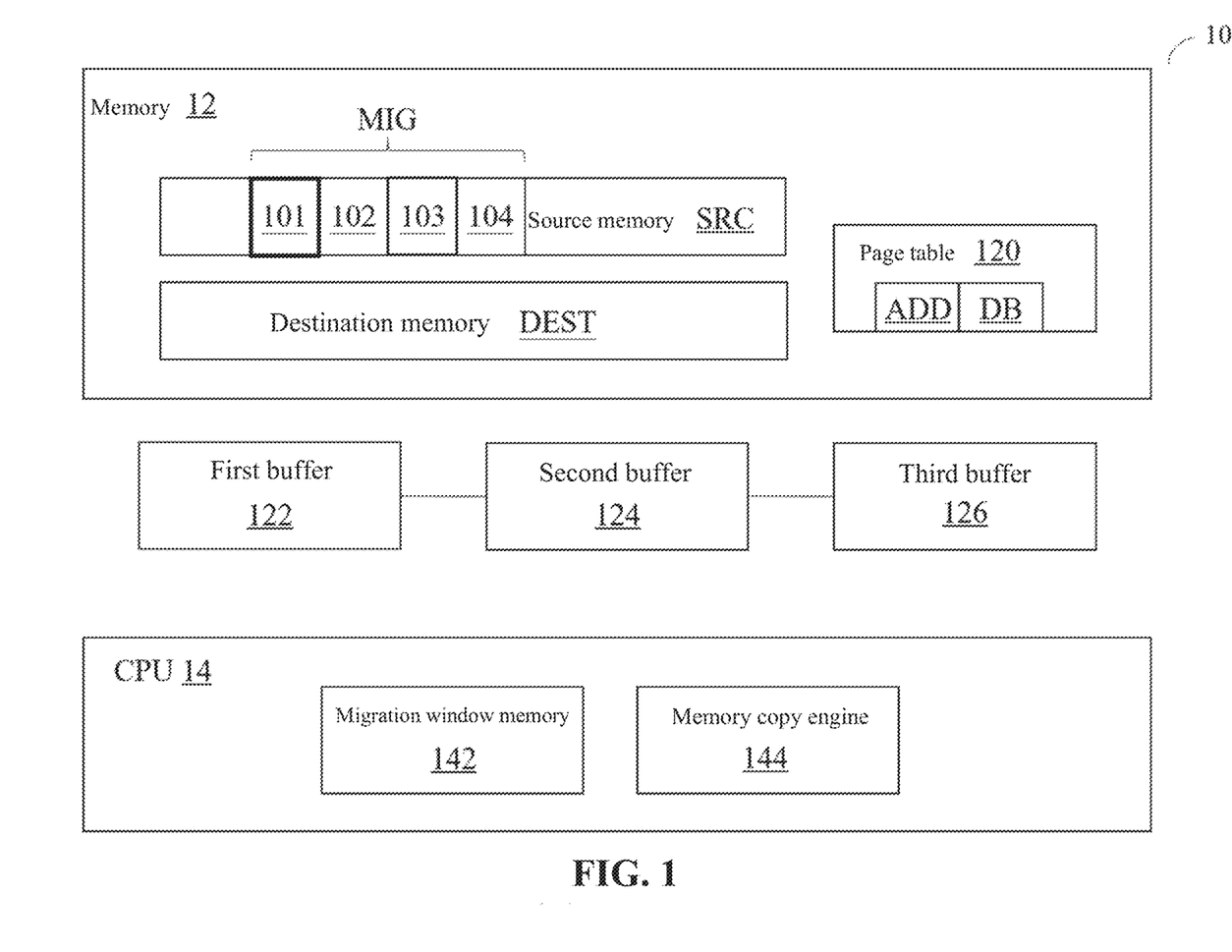
FIG. 1 is a schematic diagram of an exemplary physical host optimizing memory migration, according to some embodiments of the present disclosure.

FIG. 1 is a schematic diagram of an exemplary physical host 10 optimizing memory migration, according to some embodiments of the present disclosure. As shown in FIG. 1, physical host 10 includes a memory 12, a processor 14 (e.g., a central processing unit 14 also referred to as a CPU 14), a first buffer 122, a second buffer 124 and a third buffer 126. Memory 12 includes a source memory address SRC and a destination memory address DEST. The source memory SRC and the destination memory DEST may be any two memory blocks that do not intersect in memory 12. On physical host 10, an operating system kernel (OS kernel, not shown in FIG. 1) can migrate the part to be migrated MIG on the source memory SRC of memory 12 into the destination memory DEST of memory 12 according to actual service requirements.

When the part to be migrated MIG is too large, if the part to be migrated MIG is migrated from the source memory SRC to the destination memory DEST once, before the process of memory migration is completed, the efficiency is reduced when the application of accessing or writing the part to be migrated MIG is executed, resulting in a poor user experience effect. In order to solve this problem, physical host 10 can divide the part to be migrated MIG into multiple parts, and only one part will be migrated during each memory migration process. Processor 14 includes a migration window memory 142 for indicating that the current part that needs to be migrated in the part to be migrated MIG is within the memory range of memory 12, and the OS kernel can migrate the corresponding part according to the memory range indicated by migration window memory 142. That is to say, the memory range in which the memory migration needs to be processed currently is reduced through migration window memory 142, and the part to be migrated MIG is migrated from the source memory SRC to the destination memory DEST many times, so that the impact of physical host 10 on the overall performance is reduced due to memory migration.

For example, as shown in FIG. 1, the part to be migrated MIG can be divided into four parts 101, 102, 103 and 104, but not so limited. When migration window memory 142 indicates that the memory range of the current part that needs to be migrated is part 101, the OS kernel migrates part 101 in the part to be migrated MIG. During the migration of part 101, other parts 102, 103 and 104 (not migrated) in the part to be migrated MIG still can be accessed or written. After the migration of part 101 is completed, migration window memory 142 indicates that the memory range of the current part that needs to be migrated is part 102, the OS kernel migrates part 102 in the part to be migrated MIG. During the migration of part 102, other parts 103 and 104 (not migrated) in the part to be migrated MIG still can be accessed or written, and so on. According to the above manner, physical host 10 can reduce the memory size of the current part that needs to be migrated, so as to reduce the overall efficiency impact of physical host 10 and obtain a better user experience effect. In some embodiments, the current part that needs to be migrated in the part to be migrated MIG, which is part 101, is taken as an example for illustrating memory migration.

In the present disclosure, physical host 10 can reduce the adverse effects of internal memory migration on host performance reduction. First, the content of part 101 is copied to the destination memory DEST. However, in the process of migrating part 101 to the destination memory DEST, because the application using part 101 may still run, the content of part 101 may be written or updated, and the written or updated content needs to be migrated to the destination memory DEST in the next round of copy operation. In the above process of migrating part 101, a plurality of pages corresponding to the address of the written or updated content in part 101 in the source memory SRC are a plurality of dirty pages. In the next round of copy operation, only the content of part 101 corresponding to the plurality of dirty pages in the previous operation needs to be migrated, and in this round of copy operation, a small part of the content may still be written or updated. Therefore, several rounds of copy operations are needed to gradually complete the migration of part 101 from the source memory SRC to the destination memory DEST. As the number of rounds of copy operations increases, the content copied in each round of copy operation (namely the content corresponding to the dirty pages generated in the previous round of copy operation) gradually decreases.

In the RISCV instruction set architecture, a form entry is created for each page instead of creating a form entry for each address. The page table is implemented in hardware through a processor and a memory management unit to store the mapping relationship between virtual addresses and physical addresses. Each process in the processor maintains its own page table. When a process is switched, the corresponding page table is also switched.

Figure 2:
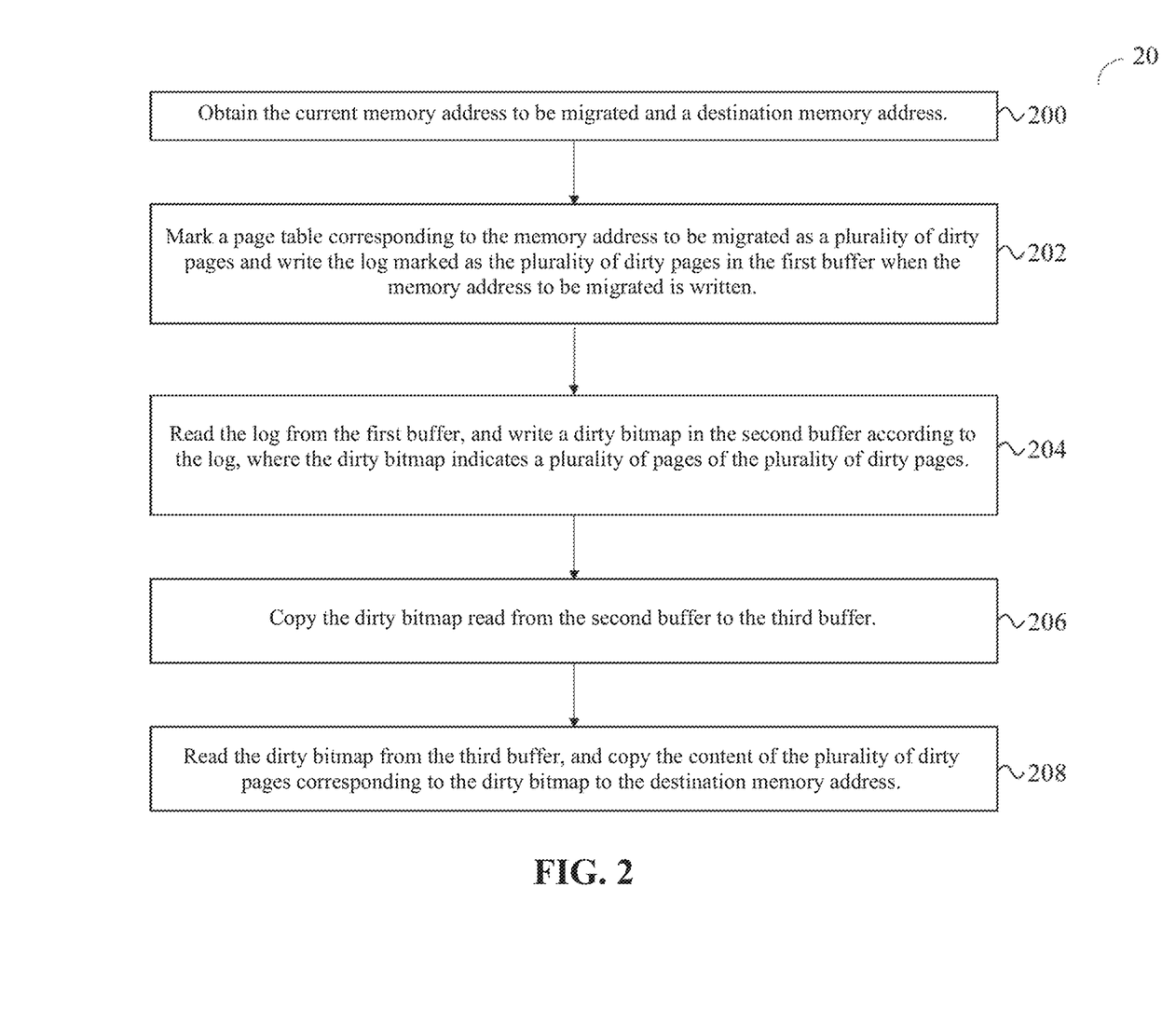
FIG. 2 is a flow chart illustrating an exemplary method of memory migration executed by a physical host, according to some embodiments of the present disclosure.

FIG. 2 is a flow chart illustrating an exemplary method 20 of memory migration executed by a physical host, according to some embodiments of the present disclosure. As shown in FIG. 2, method 20 may include step 200 to step 208, which can be implemented by a physical host (e.g., physical host 10 in FIGS. 1 and 3 to 6).

As shown in FIG. 1, memory 12 may further include a page table 120 (for example, allocated by processor 14) to store a plurality of page table entries of all pages corresponding to part 101 (that needs to be migrated currently, indicated by migration window memory 142) in the part to be migrated MIG. Each page table corresponds to a page table entry (PTE). A dirty bit (also known as modified bit) is a flag bit in the page table entry. If one page is written, the dirty bit is set to 1, indicating that the page is a dirty page. Each page table entry may include an address ADD and a dirty bit DB corresponding to each page. The address ADD indicates the corresponding position of part 101 in the source memory SRC. After part 101 is migrated to the destination memory DEST, the address ADD is updated to indicate the corresponding position of part 101 in the destination memory DEST. The dirty bit DB indicates whether the corresponding page has been written or updated. For example, when the dirty bit DB corresponding to a page is 1, it indicates that the page has been written or updated. On the contrary, when the dirty bit DB corresponding to the page is 0, it indicates that the page has not been written or updated.

Figure 3:
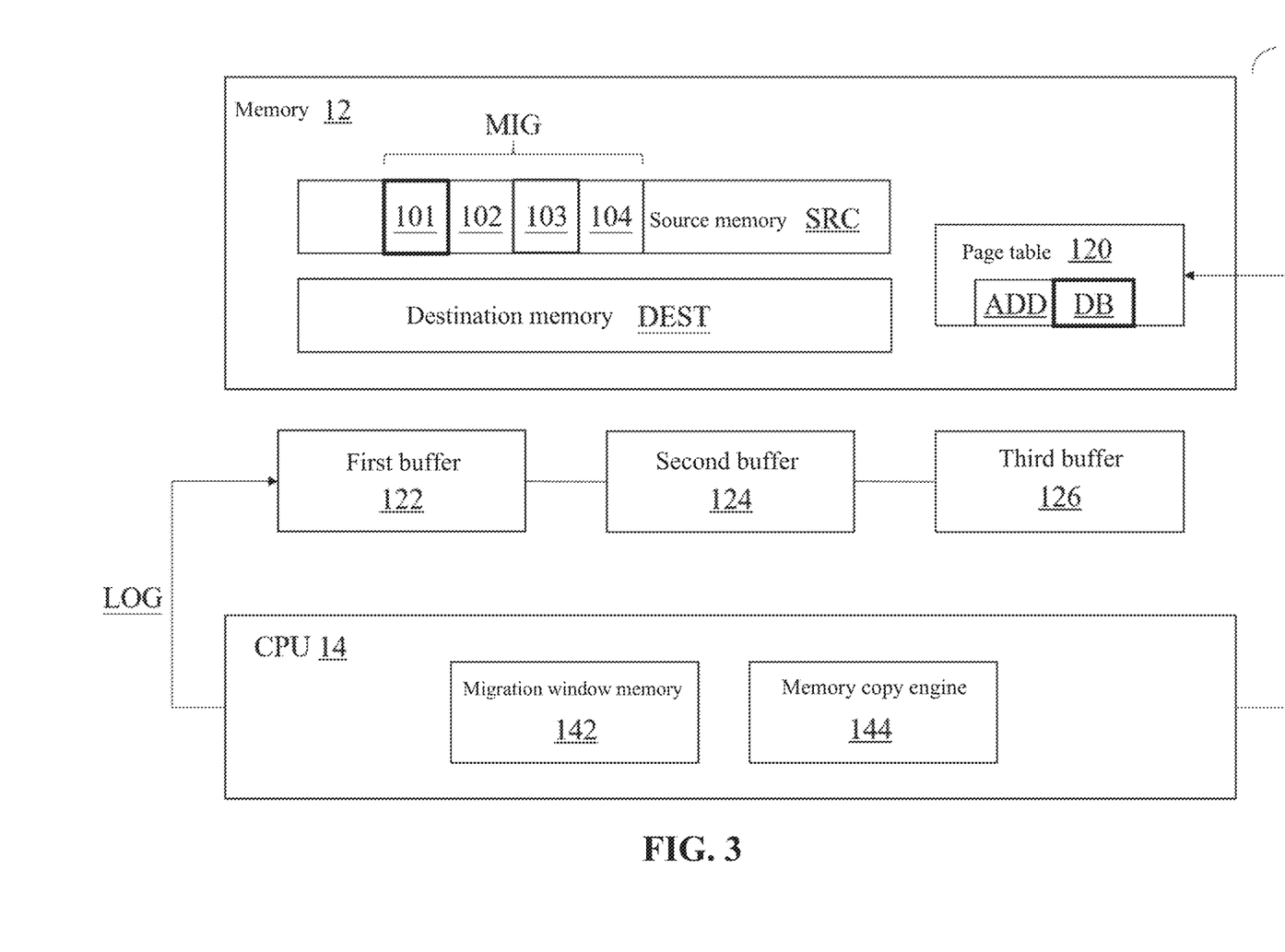
FIG. 3 is a schematic diagram of an exemplary physical host optimizing memory migration, according to some embodiments of the present disclosure.

FIG. 3 is a schematic diagram of an exemplary physical host 10 optimizing memory migration, according to some embodiments of the present disclosure. First buffer 122 stores a LOG regarding a plurality of dirty pages. With further reference to FIG. 2, in step 200 of method 20, the physical host may obtain the current memory address to be migrated and a destination memory address. Then, in step 202 of method 20, when the memory address to be migrated is written, processor 14 marks a page table corresponding to the memory address to be migrated as a plurality of dirty pages, writes the LOG marked as the plurality of dirty pages into first buffer 122, and sets a plurality of dirty bits (DBs) corresponding to a plurality of dirty pages in page table 120 to indicate that the plurality of dirty pages are written. For example, during the migration of part 101, the content corresponding to the fifth page in part 101 is written. At this time, processor 14 writes a LOG into first buffer 122 to indicate that the content corresponding to the fifth page in part 101 is written, meanwhile processor 14 may also set the dirty bit DB corresponding to the fifth page in page table 120 to 1 (indicating that the page has been written or updated). Then, the content corresponding to the fifteenth page in part 101 is also written. At this time, processor 14 writes an additional LOG for indicating that the content corresponding to the fifteenth page in part 101 is written into first buffer 122, meanwhile processor 14 may also set the dirty bit DB corresponding to the fifteenth page in page table 120 to 1.

Figure 4:
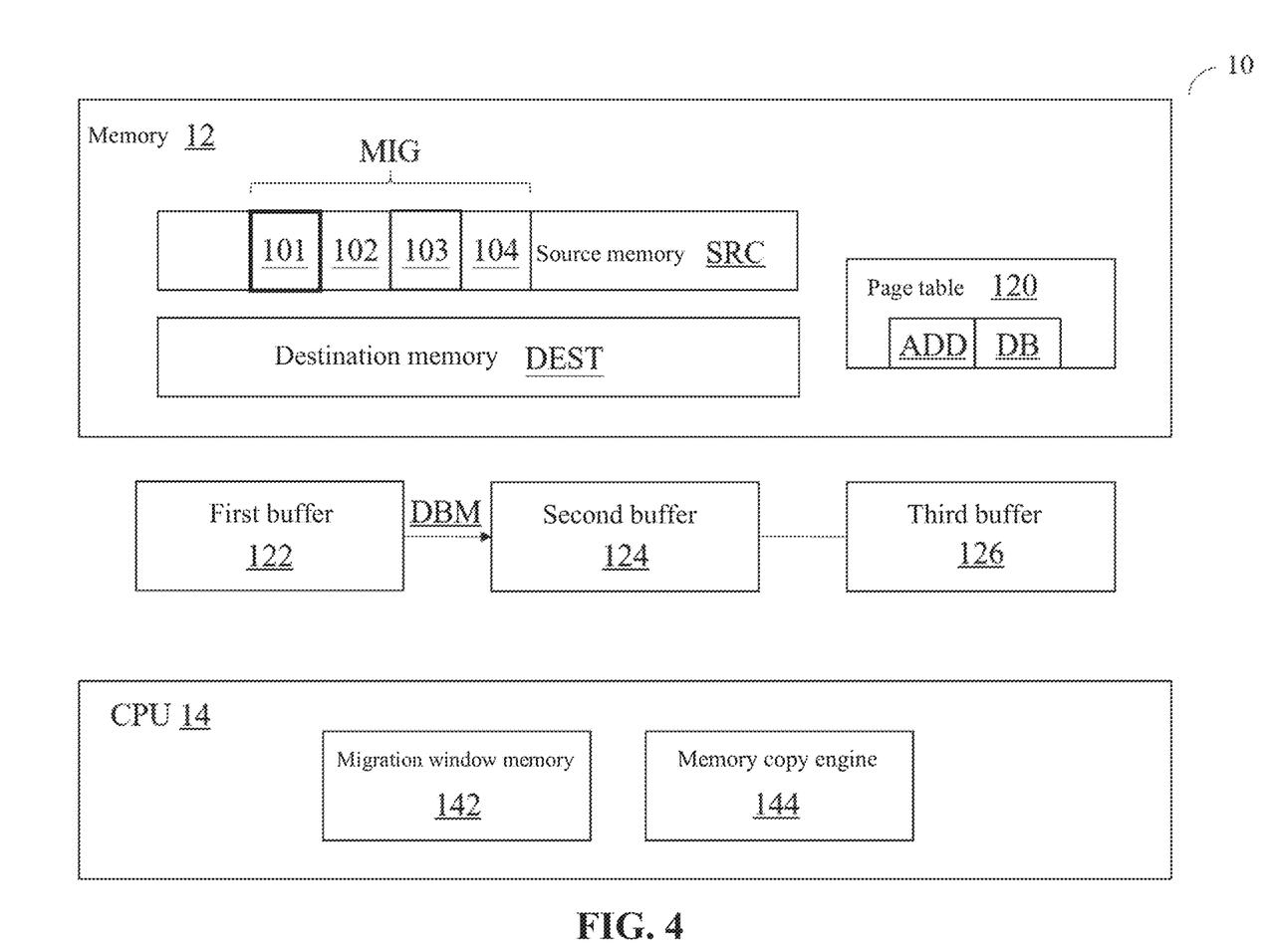
FIG. 4 is a schematic diagram of an exemplary physical host optimizing memory migration, according to some embodiments of the present disclosure.

FIG. 4 is a schematic diagram of an exemplary physical host 10 optimizing memory migration, according to some embodiments of the present disclosure. Second buffer 124 stores a dirty bitmap DBM. The dirty bitmap is a data structure that records dirty pages. In step 204 of method 20, after processor 14 writes a certain number of LOGs into first buffer 122, the OS kernel reads the LOG from first buffer 122 and writes the dirty bitmap DBM into second buffer 124 according to the LOG. The dirty bitmap DBM can indicate which pages of part 101 are dirty pages (that is, which pages are written or updated during the migration process). Continuing with the above example, the LOG in first buffer 122 indicates that the fifth page and fifteenth page of part 101 are written, and the OS kernel sets the fifth bit and fifteenth bit in the dirty bitmap DBM to 1 and sets the bits corresponding other pages that are not written to 0.

In some embodiments, the OS kernel can read the LOG in first buffer 122 according to different time points or conditions, so as to establish the dirty bitmap DBM to second buffer 124. For example, the OS kernel can read the LOG in first buffer 122 when the capacity of first buffer 122 is full because processor 14 continuously writes the LOG. In other examples, the OS kernel can periodically read the LOG in first buffer 122, but not so limited.

In some embodiments, regardless of the OS kernel reading the LOG in first buffer 122 according to any time point or condition, in order to ensure that the dirty bitmap DBM established by the OS kernel each time is based on the LOG written into first buffer 122 during the previous and current periods of reading the LOG from first buffer 122, the OS kernel may need to clear the LOG in first buffer 122 after completing the process of writing the dirty bitmap DBM in second buffer 124.

Figure 5:
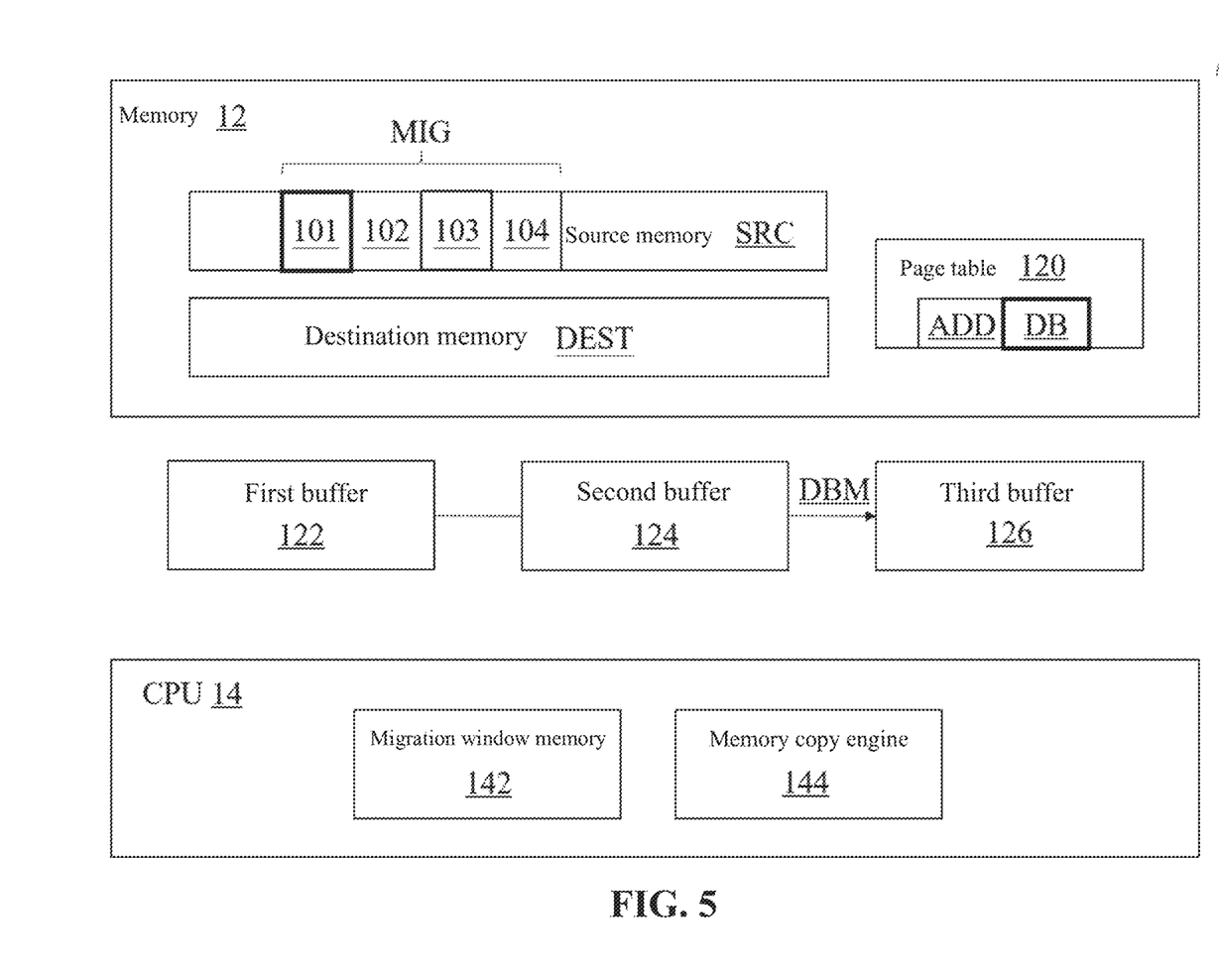
FIG. 5 is a schematic diagram of an exemplary physical host optimizing memory migration, according to some embodiments of the present disclosure.

FIG. 5 is a schematic diagram of an exemplary physical host 10 optimizing memory migration, according to some embodiments of the present disclosure. In some embodiments, in step 206 of method 20, the dirty bitmap DBM read from second buffer 124 can be copied to third buffer 126 through the OS kernel. Because the dirty bitmap DBM in second buffer 124 changes as the OS kernel reads the LOG from first buffer 122. In order to ensure that a memory copy engine 144 in processor 14 copies a dirty page to the destination memory DEST based on the dirty bitmap DBM indicating the page corresponding to the written content of part 101 during a certain period of time, third buffer 126 stores the dirty bitmap DBM for memory copy engine 144 to read.

After copying the dirty bitmap from second buffer 124 to third buffer 126, the OS kernel updates a plurality of dirty bits (DBs) corresponding to a plurality of dirty pages in page table 120 to indicate that the plurality of dirty pages are not written (that is, the plurality of dirty bits are updated to 0). That is to say, because after the OS kernel stores the dirty bitmap DBM to third buffer 126, memory copy engine 144 in processor 14 reads the dirty bitmap DBM in third buffer 126 as a basis for copying the dirty page to the destination memory DEST, in a case that the dirty page is then copied to the destination memory DEST by memory copy engine 144, the OS kernel also needs to simultaneously update the dirty bit DB corresponding to page table 120 to indicate that the pages corresponding to the plurality of dirty pages have been copied and do not need to be copied again. In other words, the dirty page that has been copied is actually no longer a dirty page, so the dirty bit DB corresponding to page table 120 needs to be updated to indicate that it has not been written.

Figure 6:
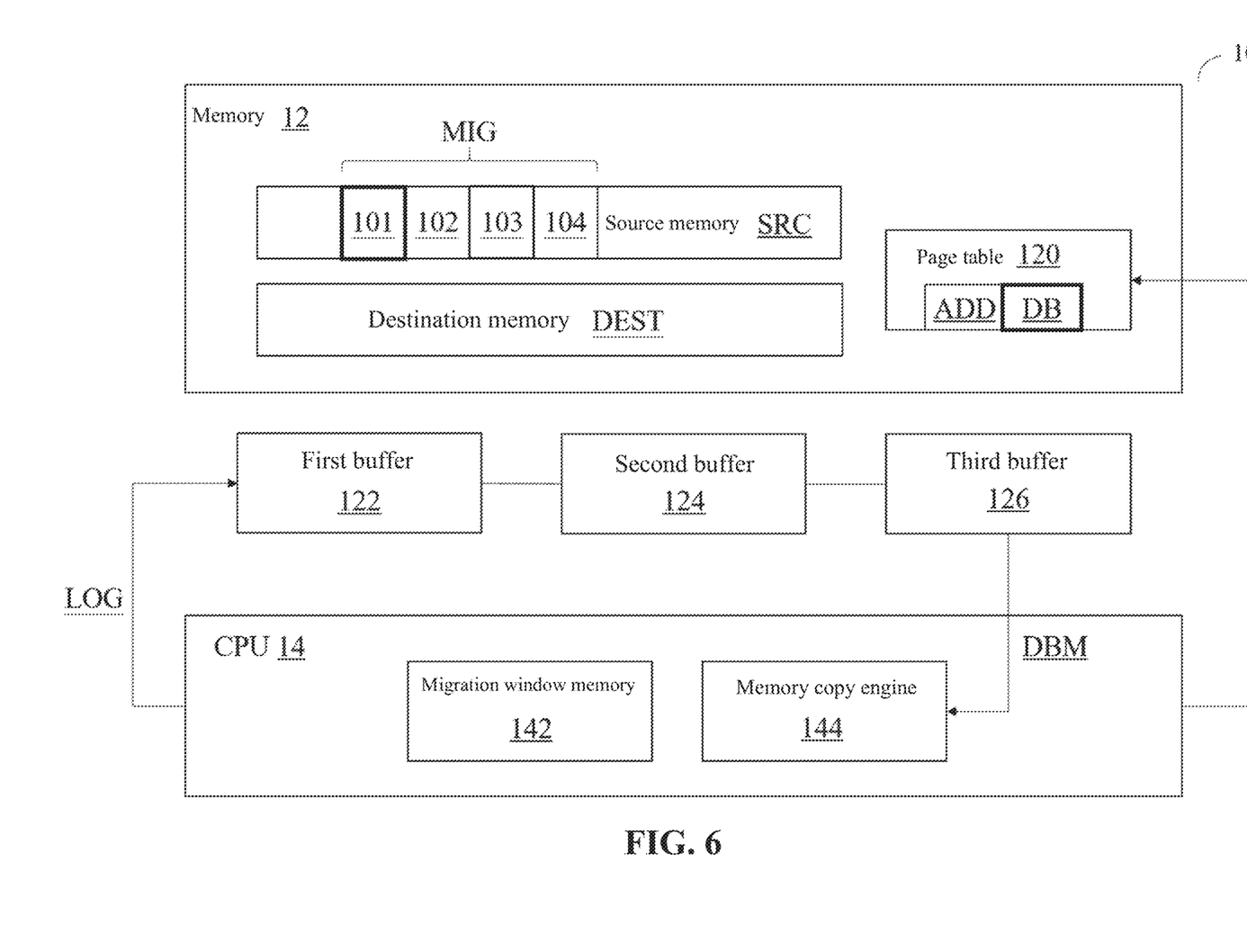
FIG. 6 is a schematic diagram of an exemplary physical host optimizing memory migration, according to some embodiments of the present disclosure.

FIG. 6 is a schematic diagram of an exemplary physical host 10 optimizing memory migration, according to some embodiments of the present disclosure. Processor 14 not only includes migration window memory 142, but also includes memory copy engine 144. In some embodiments, in step 208 of method 20, memory copy engine 144 reads the dirty bitmap DBM from third buffer 126, and copies the content of a plurality of dirty pages corresponding to the dirty bitmap DBM to the destination memory DEST. However, during the period when the content of the plurality of dirty pages corresponding to the dirty bitmap DBM is copied to the destination memory DEST, part 101 may still be written in the content. During this period, a plurality of pages of the content in which the memory address to be migrated is written are a plurality of new dirty pages. During the period when memory copy engine 144 still copies the content corresponding to the plurality of dirty pages to the destination memory DEST, processor 14 also writes the LOG regarding the plurality of new dirty pages to first buffer 122, and sets a plurality of dirty bits (DBs) corresponding to the plurality of new dirty pages in page table 120 to indicate that the plurality of new dirty pages are written. In other words, the operation of writing a plurality of dirty pages to first buffer 122 by processor 14 and the operation of copying the content corresponding to the plurality of dirty pages to the destination memory DEST by memory copy engine 144 can be performed simultaneously. The LOG written into first buffer 122 by processor 14 is used for the content corresponding to a plurality of dirty pages to be copied in the next round of copy operation (copied relative to the content of a plurality of dirty pages executed at the same time by memory copy engine 144).

As the number of rounds of copy operations gradually increases, the content corresponding to a plurality of dirty pages, needing to be copied, in each round of copy operation also gradually decreases. When the OS kernel judges that the content of part 101 is migrated to a certain extent (for example, when the number of a plurality of dirty pages is lower than a predetermined value), memory copy engine 144 stops copying the content corresponding to the plurality of dirty pages to the destination memory DEST. At this time, all pages except for the plurality of dirty pages are a plurality of clean pages. In the memory migration process of migrating the content of part 101 from the source memory SRC to the destination memory DEST, the migration of a plurality of clean pages only requires updating a plurality of page table entries corresponding to the plurality of clean pages in page table 120 to their corresponding addresses ADD in the destination memory DEST. Therefore, processor 14 updates a plurality of first page table entries corresponding to the plurality of clean pages in page table 120, where the plurality of first page table entries include addresses ADD corresponding to the plurality of clean pages in the destination memory DEST. In addition, the content corresponding to the plurality of dirty pages needs to be copied to the destination memory DEST by processor 14, and processor 14 executes a write-protection operation on the content corresponding to the plurality of dirty pages, so that the content corresponding to the plurality of dirty pages can only be read but not written or updated during subsequent copying to the destination memory DEST.

After processor 14 updates the page table entries corresponding to the plurality of clean pages in page table 120 and executes the write-protection operation on the content corresponding to the plurality of dirty pages, processor 14 copies the content corresponding to the plurality of dirty pages to the destination memory DEST and updates a plurality of second page table entries corresponding to the plurality of dirty pages in page table 120, where the plurality of second page table entries include addresses ADD corresponding to the plurality of dirty pages in the destination memory DEST. After completing the process of copying the content corresponding to the plurality of dirty pages to the destination memory DEST, processor 14 stops the write-protection operation on the content corresponding to the plurality of dirty pages, so that the content corresponding to the plurality of dirty pages is restored to the state in which the content can be read and can also be written or updated.

The memory migration in a general physical host needs to execute a write-protection operation on the content of all parts to be migrated. In the memory migration process, all parts to be migrated cannot be written or updated, so that the performance of the physical host in the memory migration process is reduced, and the user experience effect is poor. In comparison, in the present disclosure, physical host 10 first indicates the current part that needs to be migrated 101 in the part to be migrated MIG in the source memory SRC according to migration window memory 142 in processor 14, and only a small part of the content corresponding to the memory needs to be migrated currently. Subsequently, in the memory migration process, because in multiple rounds of copy operations, memory copy engine 144 of processor 14 copies most of the dirty pages corresponding to the written content of part 101 to the destination memory DEST, in the process of migrating part 101 to the destination memory DEST, a write-protection operation only needs to be executed on the content corresponding to a small number of dirty pages. Therefore, compared to the memory migration of general physical hosts, physical host 10 of the present disclosure can significantly reduce the impact on the overall performance caused by the memory migration to provide users with a better experience effect.

In some embodiments, physical host 10 further includes a memory, a processor and a computer program stored in the memory and capable of running on the processor. The processor and the memory may be connected by a bus or in other ways. The memory, as a non-transient computer-readable storage medium, can be configured to store non-transient software programs and non-transient computer executable programs. In addition, the memory may include a high-speed random access memory, and may further include a non-transient memory, such as at least one magnetic disk storage device, a flash memory device, or other non-transient solid-state storage devices. In some embodiments, the memory may include memories remotely arranged relative to the processor, and these remote memories may be connected to the processor through a network. The examples of the above network include but are not limited to the Internet, Intranet, local area networks, mobile communication networks, and combinations thereof.

A non-transient software program and instruction required for implementing the operation method of physical host 10 in some of the above embodiments are stored in the memory. When the program and instruction are executed by the processor, the operation method of the physical host in some of the above embodiments is executed. For example, step 200 to step 208 of method 20 in FIG. 2 described above are executed.

In addition, some embodiments of the present disclosure further provide a computer-readable storage medium. The computer-readable storage medium is included in the memory of physical host 10 to store a computer executable instruction. The computer executable instruction is executed by the processor (such as the processor of physical host 10) or a controller, so that the processor or the controller executes the operation method of the physical host executed by physical host 10 in some of the above embodiments. For example, step 200 to step 208 of method 20 in FIG. 2 described above can be executed.

It is appreciated that all or some of the steps and systems in the method disclosed above may be implemented as software, firmware, hardware, and appropriate combinations thereof. Some physical assemblies or all physical assemblies may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, and the computer-readable medium may include a computer storage medium (or non-temporary medium) and a communication medium (or temporary medium). As can be appreciated, the term computer storage medium includes volatile and non-volatile as well as removable and non-removable media implemented in any method or technology for storing information (such as computer-readable instructions, data structures, program modules or other data). The computer storage medium includes but is not limited to a random access memory (RAM), a read-only memory (ROM), an electrically erasable programmable read-only memory (EEPROM), a flash memory or other memory technologies, a compact disc read-only memory (CD-ROM), a digital video disk (DVD) or other optical disc memories, a magnetic case, a magnetic tape, a magnetic disk memory or other magnetic storage devices, or any other medium that can be used for storing desired information and can be accessed by computers. In addition, it is appreciated that the communication medium usually includes a computer-readable instruction, a data structure, a program module or other data in modulated data signals such as carriers or other transmission mechanisms, and may include any information delivery medium.

In conclusion, by reducing the content corresponding to the memory that needs to be migrated once and reducing the number of dirty pages that need a write-protection operation, the physical host, the operation method of the physical host and the computer-readable storage medium for executing the operation method in the present disclosure can optimize the memory migration in the host. Compared to the situation that the overall performance of a general host is prone to reduction during memory migration, the physical host, the operation method of the physical host and the computer-readable storage medium for executing the operation method in the present disclosure can effectively reduce the impact of the memory migration on the overall performance of the physical host, ensure that the application has no obvious pause, and provide users with a better experience effect.

The embodiments may further be described using the following clauses:

1. An operation method of a physical host having a memory, a processor, a first buffer, a second buffer and a third buffer, including:
   obtaining a memory address to be migrated of current and a destination memory address;
   in response to the memory address to be migrated being written, marking a page table corresponding to the memory address to be migrated as a plurality of dirty pages and writing a log marked as the plurality of dirty pages into the first buffer;
   reading the log from the first buffer, and writing a dirty bitmap into the second buffer according to the log, wherein the dirty bitmap indicates a plurality of pages of the plurality of dirty pages;
   copying the dirty bitmap read from the second buffer to the third buffer; and
   reading the dirty bitmap from the third buffer, and copying a content of the plurality of dirty pages corresponding to the dirty bitmap to the destination memory address.

2. The method according to clause 1, further including:
   clearing the log in the first buffer after writing the dirty bitmap into the second buffer.

3. The method according to clause 1 or 2, wherein during a period when the content of the plurality of dirty pages corresponding to the dirty bitmap is copied to the destination memory address, the log regarding a plurality of new dirty pages is written into the first buffer, a plurality of dirty bits corresponding to the plurality of new dirty pages in the page table are set to indicate that the plurality of new dirty pages are written, and the plurality of new dirty pages are a plurality of pages of the content written during the period in the memory address to be migrated.

4. The method according to any of clauses 1 to 3, further including:
   stopping copying the content corresponding to the plurality of dirty pages to the destination memory address in response to a number of the plurality of dirty pages being lower than a predetermined value; and
   updating a plurality of first page table entries corresponding to a plurality of clean pages in the page table, wherein the plurality of clean pages are pages other than the plurality of dirty pages, and the plurality of first page table entries include destination memory addresses corresponding to the plurality of clean pages in the destination memory.

5. The method according to clause 4, further including:
   executing a write-protection operation on the content corresponding to the plurality of dirty pages.

6. The method according to clause 5, further including:
   copying the content corresponding to the plurality of dirty pages to the destination memory address, and updating a plurality of second page table entries corresponding to the plurality of dirty pages in the page table, wherein the plurality of second page table entries include destination memory addresses corresponding to the plurality of dirty pages in the destination memory; and
   after copying the content corresponding to the plurality of dirty pages to the destination memory, stopping the write-protection operation on the content corresponding to the plurality of dirty pages.

7. A physical host, including:
   a memory;
   a first buffer configured to store a log regarding a plurality of dirty pages;
   a second buffer configured to store a dirty bitmap, wherein the dirty bitmap is written into the second buffer according to the log read from the first buffer;
   a third buffer configured to store the dirty bitmap; and
   a processor configured to obtain a memory address to be migrated of current and a destination memory address, and mark a page table corresponding to the memory address to be migrated as a plurality of dirty pages and write the log marked as the plurality of dirty pages into the first buffer in response to the memory address to be migrated being written, wherein the processor includes:
   a memory copy engine configured to read the dirty bitmap from the third buffer, and copy a content corresponding to the plurality of dirty pages to the destination memory address according to the dirty bitmap.

8. The physical host according to clause 7, wherein after writing the dirty bitmap into the second buffer, the log in the first buffer is cleared.

9. The physical host according to clause 7 or 8, wherein during a period when the content of the plurality of dirty pages corresponding to the dirty bitmap is copied to the destination memory address, the processor is further configured to write the log regarding a plurality of new dirty pages into the first buffer, and to set a plurality of dirty bits corresponding to the plurality of new dirty pages in the page table to indicate that the plurality of new dirty pages are written, wherein the plurality of new dirty pages are a plurality of pages of the content written during the period in the memory address to be migrated.

10. The physical host according to any of clauses 7 to 9, wherein the memory copy engine is further configured to stop copying the content corresponding to the plurality of dirty pages to the destination memory address in response to a number of the plurality of dirty pages being lower than a predetermined value, and the processor is further configured to update a plurality of first page table entries corresponding to a plurality of clean pages in the page table, wherein the plurality of clean pages are pages other than the plurality of dirty pages, and the plurality of first page table entries include destination memory addresses corresponding to the plurality of clean pages.

11. The physical host according to clause 10, wherein the processor is further configured to execute a write-protection operation on the content corresponding to the plurality of dirty pages.

12. The physical host according to clause 11, wherein the processor is further configured to copy the content corresponding to the plurality of dirty pages to the destination memory address, and to update a plurality of second page table entries corresponding to the plurality of dirty pages in the page table, wherein the plurality of second page table entries include destination memory addresses corresponding to the plurality of dirty pages in the destination memory.

13. The physical host according to clause 12, wherein after copying the content corresponding to the plurality of dirty pages to the destination memory, the processor is further configured to stop the write-protection operation on the content corresponding to the plurality of dirty pages.

14. A non-transitory computer-readable storage medium storing a set of instructions that are executable by one or more processors of a device to cause the device to perform operations of the physical host, the operations including:
　　obtaining a memory address to be migrated of current and a destination memory address;
　　in response to the memory address to be migrated being written, marking a page table corresponding to the memory address to be migrated as a plurality of dirty pages and writing a log marked as the plurality of dirty pages into the first buffer;
　　reading the log from the first buffer, and writing a dirty bitmap into the second buffer according to the log, wherein the dirty bitmap indicates a plurality of pages of the plurality of dirty pages;
　　copying the dirty bitmap read from the second buffer to the third buffer; and
　　reading the dirty bitmap from the third buffer, and copying a content of the plurality of dirty pages corresponding to the dirty bitmap to the destination memory address.

15. The non-transitory computer-readable storage medium according to clause 14, wherein the operations further include:
　　clearing the log in the first buffer after writing the dirty bitmap into the second buffer.

16. The non-transitory computer-readable storage medium according to clause 14 or 15, wherein during a period when the content of the plurality of dirty pages corresponding to the dirty bitmap is copied to the destination memory address, the log regarding a plurality of new dirty pages is written into the first buffer, a plurality of dirty bits corresponding to the plurality of new dirty pages in the page table are set to indicate that the plurality of new dirty pages are written, and the plurality of new dirty pages are a plurality of pages of the content written during the period in the memory address to be migrated.

17. The non-transitory computer-readable storage medium according to any of clauses 14 to 16, wherein the operations further include:
　　stopping copying the content corresponding to the plurality of dirty pages to the destination memory address in response to a number of the plurality of dirty pages being lower than a predetermined value; and
　　updating a plurality of first page table entries corresponding to a plurality of clean pages in the page table, wherein the plurality of clean pages are pages other than the plurality of dirty pages, and the plurality of first page table entries include destination memory addresses corresponding to the plurality of clean pages in the destination memory.

18. The non-transitory computer-readable storage medium according to clause 17, wherein the operations further include:
　　executing a write-protection operation on the content corresponding to the plurality of dirty pages.

19. The non-transitory computer-readable storage medium according to clause 18, wherein the operations further include:
　　copying the content corresponding to the plurality of dirty pages to the destination memory address, and updating a plurality of second page table entries corresponding to the plurality of dirty pages in the page table, wherein the plurality of second page table entries include destination memory addresses corresponding to the plurality of dirty pages in the destination memory; and
　　after copying the content corresponding to the plurality of dirty pages to the destination memory, stopping the write-protection operation on the content corresponding to the plurality of dirty pages.

As used herein, spatial relative terms "under", "below", "underneath", "above", "on" and "over" and similar terms describe the relationship between an assembly or component and a remote assembly or component illustrated in the figures. In addition to the orientation described in the figures, the spatial relative terms also aim to cover different orientations of an apparatus in use or operation. A device may be oriented in other ways (by rotating 90 degrees or by other orientations), and therefore, spatial relative descriptors used herein can also be explained.

As used herein, terms such as "first", "second" and "third" describe various assemblies, components, regions, layers and/or sections, but such assemblies, components, regions, layers and/or sections should not be restricted by such terms. This type of terms can only be used for distinguishing one assembly, component, region, layer or section from each other. For example, the terms such as "first", "second" and "third" when used herein do not imply a sequence or an order, unless explicitly indicated by the background content.

The singular forms "a/an", "one" and "the" may also include a plural form, unless otherwise specified by the context. The term "connection" and derivatives thereof can be used herein to describe the structural relationship between components. The "connection" can be used for describing two or more assemblies that are in direct physical or electrical contact with each other. The "connection" can also be used for indicating direct or indirect physical or electrical contact between two or more assemblies (with intervening assemblies between them), and/or the cooperation or interaction between the two or more assemblies.

The foregoing descriptions are merely preferred implementations of the present disclosure. It is to be noted that a plurality of improvements and refinements may be made by those of ordinary skill in the technical field without departing from the principle of the present disclosure, and shall fall within the scope of protection of the present disclosure.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An operation method of a physical host having a memory, a processor, a first buffer, a second buffer and a third buffer, comprising:
　　obtaining a current memory address to be migrated and a destination memory address;
　　in response to the current memory address to be migrated being written, marking a page table corresponding to the current memory address to be migrated as a plurality of dirty pages and writing a log marked as the plurality of dirty pages into the first buffer;
　　reading the log from the first buffer, and writing a dirty bitmap into the second buffer according to the log, wherein the dirty bitmap indicates a plurality of pages of the plurality of dirty pages;
　　copying the dirty bitmap from the second buffer to the third buffer; and
　　reading the dirty bitmap from the third buffer, and copying a content of the plurality of dirty pages corresponding to the dirty bitmap to the destination memory address.

2. The method according to claim 1, further comprising:
　　clearing the log in the first buffer after writing the dirty bitmap into the second buffer.

3. The method according to claim 1, wherein during a first period when the content of the plurality of dirty pages corresponding to the dirty bitmap is copied to the destination memory address, a log regarding a plurality of new dirty pages is written into the first buffer, a plurality of dirty bits corresponding to the plurality of new dirty pages in the page table are set to indicate that the plurality of new dirty pages are written, and the plurality of new dirty pages are a plurality of pages of the content written in the current memory address to be migrated during the first period.

4. The method according to claim 1, further comprising:
terminating copying the content corresponding to the plurality of dirty pages to the destination memory address in response to a number of the plurality of dirty pages being lower than a predetermined value; and
updating a plurality of first page table entries corresponding to a plurality of clean pages in the page table, wherein the plurality of clean pages are pages other than the plurality of dirty pages, and the plurality of first page table entries comprise destination memory addresses corresponding to the plurality of clean pages in the destination memory.

5. The method according to claim 4, further comprising:
executing a write-protection operation on the content corresponding to the plurality of dirty pages.

6. The method according to claim 5, further comprising:
copying the content corresponding to the plurality of dirty pages to the destination memory address, and updating a plurality of second page table entries corresponding to the plurality of dirty pages in the page table, wherein the plurality of second page table entries comprise destination memory addresses corresponding to the plurality of dirty pages in the destination memory; and
after copying the content corresponding to the plurality of dirty pages to the destination memory, terminating the write-protection operation on the content corresponding to the plurality of dirty pages.

7. A physical host, comprising:
a memory;
a first buffer configured to store a log regarding a plurality of dirty pages;
a second buffer configured to store a dirty bitmap, wherein the dirty bitmap is written into the second buffer according to the log from the first buffer;
a third buffer configured to store the dirty bitmap; and
a processor configured to obtain a current memory address to be migrated and a destination memory address, and mark a page table corresponding to the current memory address to be migrated as a plurality of dirty pages and write the log marked as the plurality of dirty pages into the first buffer in response to the current memory address to be migrated being written, wherein the processor comprises:
a memory copy engine configured to read the dirty bitmap from the third buffer, and copy a content corresponding to the plurality of dirty pages to the destination memory address according to the dirty bitmap.

8. The physical host according to claim 7, wherein after the dirty bitmap is written into the second buffer, the log in the first buffer is cleared.

9. The physical host according to claim 7, wherein during a first period when the content of the plurality of dirty pages corresponding to the dirty bitmap is copied to the destination memory address, the processor is further configured to write a log regarding a plurality of new dirty pages into the first buffer, and to set a plurality of dirty bits corresponding to the plurality of new dirty pages in the page table to indicate that the plurality of new dirty pages are written, wherein the plurality of new dirty pages are a plurality of pages of the content written in the current memory address to be migrated during the first period.

10. The physical host according to claim 7, wherein the memory copy engine is further configured to stop copying the content corresponding to the plurality of dirty pages to the destination memory address in response to a number of the plurality of dirty pages being lower than a predetermined value, and the processor is further configured to update a plurality of first page table entries corresponding to a plurality of clean pages in the page table, wherein the plurality of clean pages are pages other than the plurality of dirty pages, and the plurality of first page table entries comprise destination memory addresses corresponding to the plurality of clean pages.

11. The physical host according to claim 10, wherein the processor is further configured to execute a write-protection operation on the content corresponding to the plurality of dirty pages.

12. The physical host according to claim 11, wherein the processor is further configured to copy the content corresponding to the plurality of dirty pages to the destination memory address, and to update a plurality of second page table entries corresponding to the plurality of dirty pages in the page table, wherein the plurality of second page table entries comprise destination memory addresses corresponding to the plurality of dirty pages in the destination memory.

13. The physical host according to claim 12, wherein after copying the content corresponding to the plurality of dirty pages to the destination memory, the processor is further configured to stop the write-protection operation on the content corresponding to the plurality of dirty pages.

14. A non-transitory computer-readable storage medium storing a set of instructions that are executable by one or more processors of a device to cause the device to perform operations of a physical host, the operations comprising:
obtaining a current memory address to be migrated and a destination memory address;
in response to the current memory address to be migrated being written, marking a page table corresponding to the current memory address to be migrated as a plurality of dirty pages and writing a log marked as the plurality of dirty pages into a first buffer;
reading the log from the first buffer, and writing a dirty bitmap into a second buffer according to the log, wherein the dirty bitmap indicates a plurality of pages of the plurality of dirty pages;
copying the dirty bitmap from the second buffer to a third buffer; and
reading the dirty bitmap from the third buffer, and copying a content of the plurality of dirty pages corresponding to the dirty bitmap to the destination memory address.

15. The non-transitory computer-readable storage medium according to claim 14, wherein the operations further comprise:
clearing the log in the first buffer after writing the dirty bitmap into the second buffer.

16. The non-transitory computer-readable storage medium according to claim 14, wherein during a first period when the content of the plurality of dirty pages corresponding to the dirty bitmap is copied to the destination memory address, a log regarding a plurality of new dirty pages is written into the first buffer, a plurality of dirty bits corresponding to the plurality of new dirty pages in the page table are set to indicate that the plurality of new dirty pages are written, and the plurality of new dirty pages are a plurality of pages of the content written in the current memory address to be migrated during the first period.

17. The non-transitory computer-readable storage medium according to claim 14, wherein the operations further comprise:

terminating copying the content corresponding to the plurality of dirty pages to the destination memory address in response to a number of the plurality of dirty pages being lower than a predetermined value; and updating a plurality of first page table entries corresponding to a plurality of clean pages in the page table, wherein the plurality of clean pages are pages other than the plurality of dirty pages, and the plurality of first page table entries comprise destination memory addresses corresponding to the plurality of clean pages in the destination memory.

18. The non-transitory computer-readable storage medium according to claim 17, wherein the operations further comprise:

executing a write-protection operation on the content corresponding to the plurality of dirty pages.

19. The non-transitory computer-readable storage medium according to claim 18, wherein the operations further comprise:

copying the content corresponding to the plurality of dirty pages to the destination memory address, and updating a plurality of second page table entries corresponding to the plurality of dirty pages in the page table, wherein the plurality of second page table entries comprise destination memory addresses corresponding to the plurality of dirty pages in the destination memory; and after copying the content corresponding to the plurality of dirty pages to the destination memory, terminating the write-protection operation on the content corresponding to the plurality of dirty pages.

* * * * *